United States Patent Office 2,768,197
Patented Oct. 23, 1956

2,768,197

DIACID ESTERS OF GLYCOLS AND GLYCOL-URETHANES AND PROCESS OF MAKING THE SAME

Marcel Jean Viard, Bois Colombe, France, assignor to Societe Anonyme des Manufactures des Glaces et Produits Chimiques de Saint-Gobain, Chauny et Cirey, Paris, France No Drawing. Application August 2, 1952, Serial No. 302,409

Claims priority, application France August 3, 1951

14 Claims. (Cl. 260—475)

This invention deals with the esters of dicarboxylic acids one of the functions of which is saturated by a glycol and the other one by a glycolurethane. These esters correspond to the following formula:

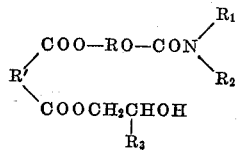

in which $R_1$ $R_2$ and $R_3$ represent an hydrogen atom or a monovalent radical, which may be substituted, R represents an aliphatic divalent radical, and R' any divalent radical.

In the present specification these esters are given the name glycolurethane esters.

Further, the present invention contemplates a process for producing these new esters. The said process consists in reacting the epoxides (corresponding to the formula

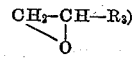

with the acid esters of glycol monourethanes of the formula:

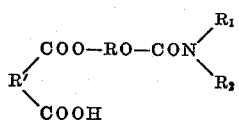

The reaction takes place as follows:

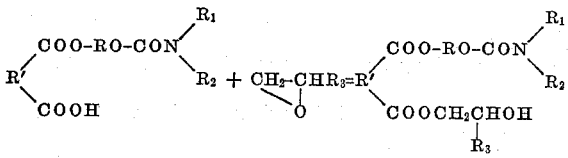

It is operated very easily with the best yield by treating the acid ester of glycol monourethane with an equimolecular quantity of epoxide at a temperature of about 80 to 90° C. It is also possible to use an excess of epoxide, which generally results in hastening the reaction.

One can determine the stage of the reaction and its end point by determining the acid number of the products of the reaction.

When the epoxide used in the reaction has a melting point rather high, above 100° C. for instance, it is sufficient to heat it with the acid ester of glycol monourethane. If it is a volatile epoxide as for instance ethylene oxide, it is suitable to bubble it, in gaseous form, into the ester, which is maintained at the reaction temperature.

The reaction may also be effected in the presence of a catalyst.

The most suitable catalysts are the tertiary amines, such as dimethyl or diethylaniline, and the heterocyclic bases, pyridine for instance.

The use of these catalysts increases the speed of the reaction substantially. In some cases especially when starting, this may become so exothermic as to make necessary the cooling of the mixture.

It is to be noted that some catalysts, particularly the substituted anilines, result in a coloration of the product obtained. If such coloration would be avoided, one should either operate without catalyst, or use a heterocyclic base such as pyridine as the catalyst.

The operation may be effected in or without a solvent. In particular it is possible to do without solvent if the acid ester of glycol monourethane which is to be used has a melting point below the reaction temperature (80/90° C).

Otherwise, any solvent may be used, provided it is unable to react with the epoxides.

It is also possible to use as a solvent an excess of the epoxide, itself, when it is liquid, such as epichlorhydrin. Further, this excess of epoxide is particularly advantageous in hastening the reaction, as above indicated, and in producing the glycol urethane ester in a perfectly neutral state.

The following examples illustrate this invention.

Example I

A mixture of 203 g. (1 mol) of acid maleate of ethylene-glycol urethane with 98 g. (1 mol plus 5%) of epichlorhydrin was heated in a water-bath at 90° C. during 8 to 10 hours, a like mixture containing diethylaniline as a catalyst was heated only five hours.

After reaction, the reaction masses showed an acid number of 5 only. The product obtained was heated in vacuo in order to eliminate the excess of epichlorhydrin. 288 g. of a viscous, slightly yellow liquid was obtained from each mixture, of which each had an acid number of 5. The formula of the products is:

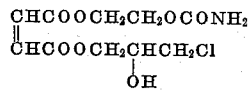

It may be called maleate of chloropropylglycol and ethyleneglycolcarbamate.

Example II

A similar operation as above was effected with 219 g. (1 mol) of ethylene glycol N-methylurethane acid succinate and 38 g. of epichlorhydrin in the presence of 4 g. of diethylaniline acting as a catalyst.

The operation was terminated within 5 to 6 hours (the duration would have been from 14 to 15 hours in the absence of a catalyst.) A yield of 311 g. of a viscous liquid was obtained showing an acid number of 0. This liquid is the succinate of glycol N-methylcarbamate and chloropropylglycol.

This compound is soluble in alcohol and dichlorethane. Its formula is the following:

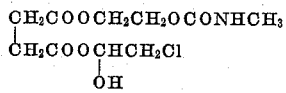

Example III

A mixture of 231 g. (1 mol) of ethylene glycol N-ethylurethane acid maleate and 150 g. of epichlorhydrin was heated in the water-bath. After heating during 12 hours at 90° C. the excess of epichlorhydrin was distillated off and one obtained 320° g. of glycol urethane ester showing an acid number equal to 0.

This product may be called maleate of glycol N-ethylurethane and chloropropylglycol; its formula is as follows:

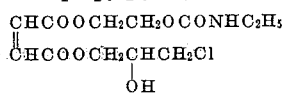

It is a viscous liquid, soluble in most solvents but for the benzenic hydrocarbons.

*Example IV*

One operated as above with 205 g. (1 mol) of ethylene glycolurethane acid succinate and 98 g. of epichlorhydrin in the presence of 4 g. of dimethylanilin. The operation was terminated within 6 hours. One obtained 295 g. of a viscous liquid of slightly yellow color. The latter is the succinate of ethylene glycol urethane and chloropropylglycol according to the following formula:

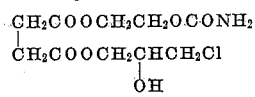

*Example V*

One put in a flask 126.5 g. (½ mol) of ethyleneglycol urethane acid phthalate and 100 g. of epichlorhydrin, that is an excess of epichlorhydrin which acts as solvent, the latter being used because the phthalate employed as the starting material has a high melting point. After 8 to 9 hours heating at 95° C. the acid number of the product obtained became equal to 0. The excess of epichlorhydrin is distillated off under vacuum and one obtained 172 g. of phthalate of ethyleneglycol urethane and chloropropylglycol. The latter is a viscous liquid soluble in alcohol, acetone, chloroform, and dichlorethane, but insoluble in benzene.

In the previous examples, the epoxide was epichlorhydrin. If one uses ethylene oxide instead of epichlorhydrin, one obtains esters of glycol urethane and of ethyleneglycol. These are the only esters of the group which possess a primary alcohol function.

*Example VI*

A quantity of 101.5 g. (½ mol) of ethyleneglycol mono-urethane acid maleate was melted in a water-bath at 85° C. A stream of gaseous ethylene oxide was passed into the melted product with agitation.

After reacting for 8 hours, the acid number of the product was down to 4, and the reaction was practically terminated. After having distillated off under vacuum, the slight excess of ethylene oxide which remained in solution, one obtained 125 g. of a yellow viscous liquid, consisting of the maleate of ethylene glycol and ethyleneglycol mono-urethane. Its formula is as follows:

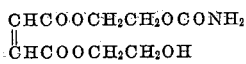

In a similar way the following glycol urethane esters were prepared:

ethylene glycol mono-urethane, and ethylene glycol, succinate
ethylene glycol N-ethylurethane, and ethylene glycol, maleate
ethylene glycol N-methylurethane, and ethylene glycol, succinate
ethylene glycol N-methylurethane, and ethylene glycol, phthalate
ethylene glycol N N' diethylurethane, and ethylene glycol, maleate These compounds are viscous liquids, more or less coloured, yellow or brown, soluble in alcohol, acetone, chloroform and dichlorethane.

All the esters of glycol and of glycolurethane which are the object of the present invention, are easily prepared with a good yield. They may be used as starting materials in the manufacture of artificial resins, through condensation for instance they may be condensed with aldehydes or diisocyanic esters or any other reagent able to cause reactions which result in the production of highly polymerized substances.

The esters which are concerned by this invention and particularly those obtained from ethylene oxide, have good stability: heating at 160° C. for 4 hours does not alter them harmfully.

That which is claimed is:

1. As a new composition of matter the esters of dicarboxylic acids, from the class consisting of lower aliphatic dicarboxylic acids and dicarboxylic acids having not more than 2 aromatic nuclei, in which the first acid function is esterfied by a glycol containing 2 to 6 atoms of carbon in the chain and the second by a glycolurethane, the glycol urethane being of the formula:

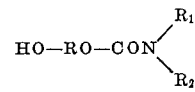

in which R is an aliphatic radical having 2 to 6 carbon atoms in the chain, $R_1$ is one of a group consisting of hydrogen and an aliphatic radical having 1 to 4 carbon atoms in the chain, $R_2$ is one of the group consisting of hydrogen and an aliphatic radical having 1 to 4 carbon atoms in the chain.

2. As a new composition of matter the esters having the formula:

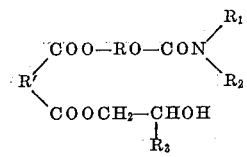

in which

is the residue of one of a group consisting of the lower aliphatic dicarboxylic acids and aromatic dicarboxylic acids having not more than 2 ring nuclei, R is an aliphatic radical having 2 to 6 carbon atoms, and $R_1$, $R_2$, and $R_3$ are each one of a group consisting of hydrogen and aliphatic radicals having 1 to 4 carbon atoms.

3. The maleate of chloropropylglycol and ethyleneglycolcarbamate.

4. The succinate of glycol N-methylcarbamate and chloropropylglycol.

5. The maleate of glycol N-ethylurethane and chloropropylglycol.

6. The succinate of ethyleneglycol urethane and chloropropylglycol.

7. The phthalate of ethyleneglycol urethane and chloropropylglycol.

8. A process of manufacture of the esters according to claim 1 which comprises reacting an epoxide having the general formula:

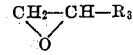

with an acid ester of glycol mono-urethane having the general formula:

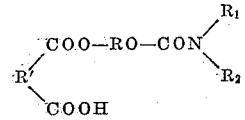

in which

is the residue of one of a group consisting of the lower aliphatic dicarboxylic acids and aromatic dicarboxylic acids having not more than 2 ring nuclei and R is an aliphatic radical having 2 to 6 carbon atoms in the chain, $R_1$ is one of a group consisting of hydrogen and an aliphatic radical having 1 to 4 carbon atoms in the chain, $R_2$ is one of a group consisting of hydrogen and an aliphatic radical having 1 to 4 carbon atoms in the chain, and $R_3$ is one of a group consisting of hydrogen and an aliphatic radical having 1 to 4 carbon atoms.

9. A process according to claim 8 which comprises operating at a temperature in the range from 80 to 90° C.

10. The process according to claim 9 which comprises using an excess of epoxide over the equimolecular ratio.

11. The process according to claim 8 in which the catalyst is pyridine.

12. The process according to claim 8 in which the catalyst is a tertiary amine.

13. The process according to claim 8 using an epoxide being gaseous at reaction temperature which comprises passing the gaseous epoxide into the glycol urethane acid ester maintained at reaction temperature of about 80 to 90° C.

14. The process according to claim 8 in which the reaction is carried out in the presence of a catalytic quantity of one of a group consisting of the teritary amines and the heterocyclic amine bases.

No references cited